United States Patent
Yamauchi

(10) Patent No.: US 9,726,057 B2
(45) Date of Patent: Aug. 8, 2017

(54) LUBRICATION CONTROL DEVICE FOR IN-WHEEL MOTOR UNIT FOR VEHICLE

(75) Inventor: Yasuhiro Yamauchi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 168 days.

(21) Appl. No.: 13/819,105

(22) PCT Filed: Feb. 28, 2012

(86) PCT No.: PCT/JP2012/054866
§ 371 (c)(1),
(2), (4) Date: Feb. 26, 2013

(87) PCT Pub. No.: WO2012/140963
PCT Pub. Date: Oct. 18, 2012

(65) Prior Publication Data
US 2013/0153338 A1 Jun. 20, 2013

(30) Foreign Application Priority Data

Apr. 13, 2011 (JP) ................................. 2011-088790
Apr. 14, 2011 (JP) ................................. 2011-089779
(Continued)

(51) Int. Cl.
*F01M 1/16* (2006.01)
*F01M 1/02* (2006.01)
(Continued)

(52) U.S. Cl.
CPC ............. *F01M 1/16* (2013.01); *B60K 7/0007* (2013.01); *B60K 17/046* (2013.01); *F01M 1/02* (2013.01);
(Continued)

(58) Field of Classification Search
CPC ........ F01M 1/02; F01M 1/16; F16H 57/0434; F16H 57/0447
See application file for complete search history.

(56) References Cited

U.S. PATENT DOCUMENTS 5,217,085 A * 6/1993 Barrie et al. ................ 184/104.1
5,996,739 A * 12/1999 Hoffmann ..................... 184/7.4
(Continued)

FOREIGN PATENT DOCUMENTS

JP 6-81929 A 3/1994
JP 2001-173762 6/2001
(Continued)

*Primary Examiner* — Minh Truong
(74) *Attorney, Agent, or Firm* — Foley & Lardner LLP

(57) ABSTRACT

A lubrication control device of in-wheel motor units for a vehicle which is used in an in-wheel motor drive vehicle which can run by driving at least a pair of left and right wheels by the respective in-wheel motor units, the lubrication control device being arranged to lubricate insides of the pair of left and right in-wheel motor units, by an oil pumped from lower portions within cases of the in-wheel motor units by respective oil pumps, the lubrication control device includes: an oil pump drive control section configured to control and drive the oil pumps so that oil levels of the lower portions within the cases of the left and right in-wheel motor units are the same by oil pumping amounts from the oil pumps.

10 Claims, 5 Drawing Sheets

(30) Foreign Application Priority Data

Sep. 15, 2011 (JP) .................................. 2011-201798
Sep. 15, 2011 (JP) .................................. 2011-201801

(51) Int. Cl.
  *F16H 57/04* (2010.01)
  *B60K 7/00* (2006.01)
  *B60K 17/04* (2006.01)
  *H02K 7/116* (2006.01)
  *H02K 9/19* (2006.01)

(52) U.S. Cl.
  CPC ......... *F16H 57/0447* (2013.01); *H02K 7/116* (2013.01); *H02K 9/19* (2013.01); *B60K 2007/0038* (2013.01); *B60K 2007/0092* (2013.01); *B60L 2220/44* (2013.01); *B60Y 2306/03* (2013.01); *F16H 57/0409* (2013.01); *Y02T 10/641* (2013.01)

(56) References Cited

U.S. PATENT DOCUMENTS

| | | | | |
|---|---|---|---|---|
| 8,079,335 | B2* | 12/2011 | Rollinger | F01L 1/34 123/90.15 |
| 2004/0187835 | A1* | 9/2004 | Hoff et al. | 123/196 R |
| 2010/0140020 | A1* | 6/2010 | Murahashi | B60B 11/06 184/6.12 |
| 2012/0048228 | A1* | 3/2012 | Chung | 123/196 R |
| 2012/0118257 | A1* | 5/2012 | Chung | 123/196 R |
| 2014/0041619 | A1* | 2/2014 | Yamauchi | 123/196 R |

FOREIGN PATENT DOCUMENTS

| | | |
|---|---|---|
| JP | 2008-195233 A | 8/2008 |
| JP | 2009-241911 A | 10/2009 |
| JP | 2010-220274 A | 9/2010 |
| JP | 2010-247657 A | 11/2010 |
| JP | 2010-249220 A | 11/2010 |

* cited by examiner

FIG.1

LUBRICATION CONTROL DEVICE FOR IN-WHEEL MOTOR UNIT FOR VEHICLE

TECHNICAL FIELD

This invention relates to a lubrication control device which is useful for a drive unit (hereinafter, referred to as an in-wheel motor unit) for each wheel that is used in an electric vehicle which can run by driving the wheels by respective electric motors.

BACKGROUND ART

An in-wheel motor unit includes a reduction gear mechanism such as a planetary gear set in addition to the above-described electric motor, as described in, for example, a patent document 1. These are constituted as one unit. The in-wheel motor unit decreases a speed of the rotational power from the electric motor by the reduction gear mechanism, and transmits this reduced power to a wheel to drive the wheel.

Accordingly, the in-wheel motor unit needs to lubricate the above-described reduction gear mechanism.

However, when the above-described lubrication is depend on the oil raised up by rotation members within the in-wheel motor unit, oil stirring resistance increases consumed electric power of the in-wheel motor unit (the electric motor), this causes large deterioration of electricity cost (electricity economy) which is a highest priority issue for an electric vehicle.

Accordingly, in a conventional art, as described in the patent document 1, the oil in the lower portion within the in-wheel motor unit is sucked by using an oil pump whose the consumed electric power is much smaller than the consumed electric power by the oil stirring resistance. A predetermined lubrication is often performed by supplying this oil to lubrication necessary portions (portions in which the lubrication is needed).

In a lubrication control art described in the patent document 1 at this lubrication, when oil temperatures within the in-wheel motor units of a pair of left and right wheels are different from each other, the lubrication oil amount of the high temperature side in-wheel motor unit (the oil pumping amount by the oil pump) is increased than the lubrication oil amount of the low temperature side in-wheel motor unit (the oil pumping amount by the oil pump), so that the oil temperature difference between the left and right in-wheel motor units is eliminated.

In this lubrication control art of the in-wheel motor unit, the driving force difference between the left and right wheels due to the oil temperature difference between the left and right in-wheel motor units is relieved. Accordingly, it is possible to improve the running stability of the in-wheel motor drive electric vehicle.

However, in the art in which the lubrication oil amounts of the left and right in-wheel motor units (the oil pumping amounts by the oil pumps) are different from each other as described in the patent document 1, the oil levels in the lower portions within the left and right in-wheel motor units are different from each other, so that below-described problems are caused.

That is, the electric motor within the in-wheel motor unit has a diameter larger than a diameter of the reduction gear mechanism, as described in the patent document 1. When it is considered that a required mountability needs to be ensured by decreasing a radial size of the in-wheel motor unit as much as possible, it is not possible to set a large gap between the electric motor and the in-wheel motor unit case.

On the other hand, the oil pump needs to pump (suck and transfer) the oil in the lower portion within the in-wheel motor unit case even at vibration and inclination of the vehicle. The oil level in the lower portion within the in-wheel motor unit case needs to be considerably high so that the oil pump can suck the oil even at the vibration and the inclination.

For these reasons, it is unavoidable that the electric motor (rotational rotor) having the large diameter is dipped in the oil in the lower portion within the in-wheel motor unit.

By the way, in a case where (in a method that) the lubrication oil amounts of the left and right in-wheel motor units (the oil pumping amounts by the oil pumps) are different from each other as described in the patent document 1, the levels of the oil in the lower portions within the left and right in-wheel motor units are different from each other, so that below-described problems are caused.

That is, a case that the oil levels in the lower portions within the left and right in-wheel motor unit cases are different from each other means that the oil dipping amounts of the electric motors (the rotational rotors) which are positioned below the oil levels are different between the left and right in-wheel motor units.

In this way, when the oil dipping amounts of the electric motors (the rotational rotors) are different between the left and right in-wheel motor units, the oil stirring resistances by the electric motors (the rotational rotors) are different between the left and right in-wheel motor units, so that the driving force difference is generated between the left and right wheels. Accordingly, there is generated a problem that the running stability of the in-wheel motor drive vehicle is deteriorated.

PRIOR ART DOCUMENT

Patent Document

Patent Document 1: Japanese Patent Application Publication No. 2008-195233

SUMMARY OF THE INVENTION

It is an object of the present invention to provide a lubrication control device of an in-wheel motor unit for a vehicle which is devised to dissolve the above-described problems by controlling oil pumps so that oil levels in lower portions within left and right in-wheel motor unit cases are maintained to the same.

For this object, the lubrication control device of the in-wheel motor unit for the vehicle according to the present invention are constituted as follows.

First, the in-wheel motor driving vehicle which is the precondition of the present invention and the lubrication control device for the in-wheel motor units used in this in-wheel motor drive vehicle are illustrated. The in-wheel motor drive vehicle can run by driving at least a pair of left and right wheels by respective in-wheel motor units. Moreover, the lubrication control device of the in-wheel motor units used in this vehicle lubricate the insides of the above-described pair of left and right in-wheel motor units, by the oil pumped (sucked and transferred) from the lower portions within the in-wheel motor unit cases by the respective oil pumps.

In the present invention, the lubrication control device of the in-wheel motor units includes an oil pump drive control means which is configured to drive and control (drivingly control) the above-described oil pumps so that the oil levels in the lower portions within the cases of the left and right in-wheel motor units are the same by the oil pumping (suction/transferring) amounts from the oil pumps.

In the lubrication control device of the in-wheel motor units for the vehicle according to the present invention, the oil pumping amounts from the oil pumps are drivingly controlled so that the oil levels in the lower portions within the cases of the left and right in-wheel motor units are the same. Accordingly, the oil levels in the lower portions within the cases of the left and right in-wheel motor units are maintained to the same.

Accordingly, the oil dipping amounts of the larger diameter rotational members within the in-wheel motor units are the same between the left and right in-wheel motor units. The oil stirring resistances by these larger diameter rotational members are the same between the left and right in-wheel motor units.

Therefore, the driving force difference is not generated between the left and right wheels. It is possible to dissolve the above-described problem that the running stability of the in-wheel motor driving vehicle is deteriorated.

BRIEF DESCRIPTION OF DRAWINGS

FIG. 1 is a longitudinal sectional side view showing an in-wheel motor unit provided with a lubrication control device according to one embodiment of the present invention.

FIG. 2(a) is a detailed longitudinal sectional side view which is taken along a section line II-II of FIG. 2(b), and which shows the oil guide as viewed from an arrow. FIG. 2(b) is a detailed front view showing the oil guide as viewed from a right side of FIG. 2(a).

DESCRIPTION OF EMBODIMENTS

Figure 2:
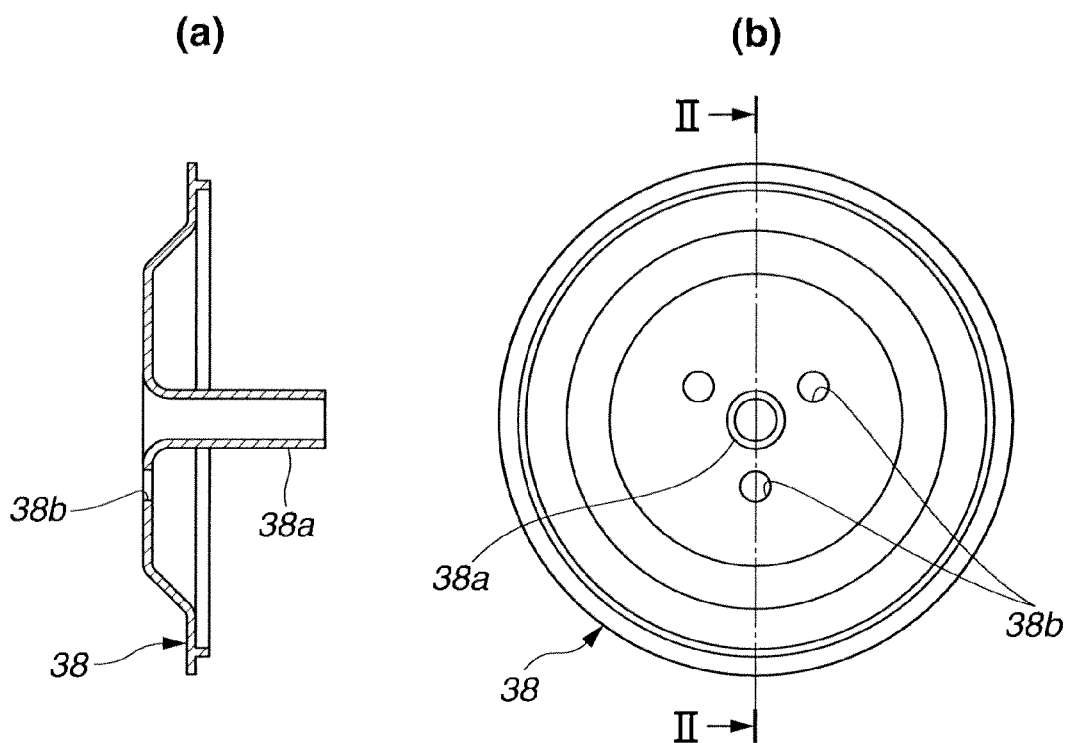
FIG. 2 show an oil guide provided within an oil gallery of the in-wheel motor unit of FIG. 1.

Hereinafter, embodiments of the present invention will be illustrated in details with reference to examples shown in the drawings.

Figure 1:
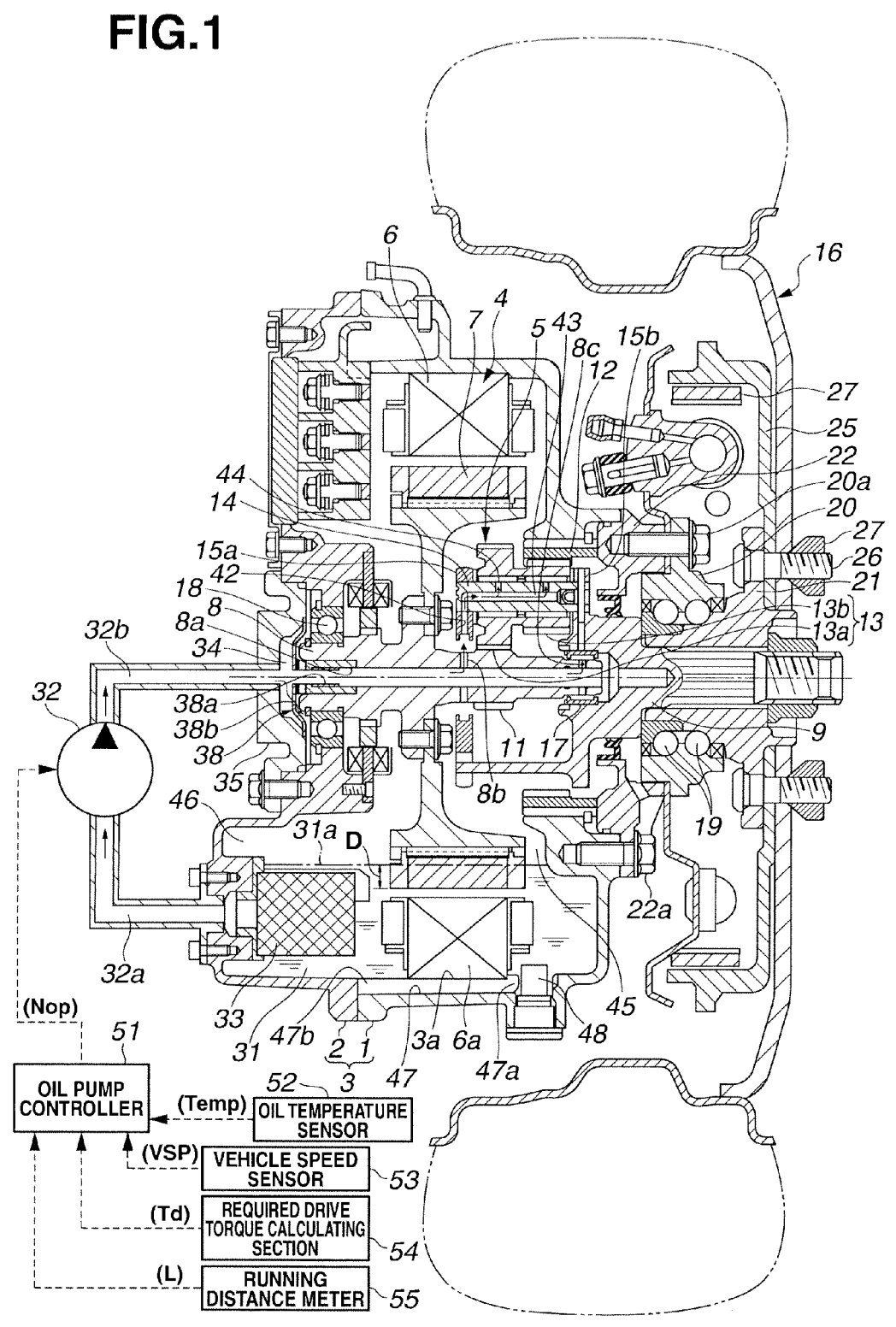

FIG. 1 is a longitudinal sectional side view showing an in-wheel motor unit provided with a lubrication control device according to one embodiment of the present invention.

In this drawing, a numeral 1 is a case main body of the in-wheel motor unit. A numeral 2 is a rear cover of the case main body 1. A unit case 3 of the in-wheel motor unit is constituted by mutual coalition (combination) of these case main body 1 and rear cover 2.

The in-wheel motor unit shown in FIG. 1 includes an electric motor 4 and a planetary gear type reduction gear set 5 (hereinafter, referred to merely as a "reduction gear set (speed reducing gear set)") which are received within the unit case 3.

The electric motor 4 includes an annular stator 6 fit in an inner circumference of the case main body 1, and fixed to the case main body 1, and a rotor 7 which is coaxially disposed within an inner circumference of the annular stator 6 with a radial gap.

The reduction gear set 5 serves for drivingly connecting an input shaft 8 and an output shaft 9 which are disposed to be coaxially abutted to confront each other. The reduction gear set 5 includes a sun gear 11, a fixed ring gear 12 which is disposed to be deviated in an axial direction with respect to the sun gear 11 to approach the output shaft 9, and to be coaxial with this sun gear 11, stepped planetary pinions (stepped pinions) 13 engaged with these sun gear 11 and ring gear 12, pinion shafts 14 rotatably supporting these stepped planetary pinions 13, and carrier 15a and 15b supporting the pinion shafts 14.

The input shaft 8 is provided with the sun gear 11 integrally molded with an inner end of the input shaft 8 which is closer to the output shaft 9. This input shaft 8 extends in a rearward direction from the sun gear 11 toward the rear cover 2. The output shaft 9 extends from the reduction gear set 5 in an opposite direction (forward direction). The output shaft 9 protrudes from a front end opening (a right side of the drawing) of the case main body 1. At this protruding portion, the output shaft 9 is connected with a wheel 16 as described later.

These input shaft 8 and output shaft 9 are mutually inserted through at the coaxial abutment end portions of the input shaft 8 and the output shaft 9 so as to be relatively rotated. A bearing 17 which may be a ball bearing is disposed between the input shaft 8 and the output shaft 9, so that an input/output shaft in-between bearing mounting portion is set.

Portions of the input shaft 8 and the output shaft 9 which are apart from this bearing 17 in the axial direction are supported to the unit case 3, respectively, by a bearing 18 which may be a ball bearing and a bearing 19 which may be a double row angular bearing.

Besides, the bearing 19 is disposed between an inner circumference of an end cover 20 closing the front end opening of the case main body 1, and an outer circumference of a wheel hub 21 fit on the protruding portion of the output shaft 9 which protrudes from the front end opening of the case main body 1.

In the electric motor 4, the rotor 7 is connected with the input shaft 8. This connection position between the rotor 7 and the input shaft 8 is an axial position between the reduction gear set 5 and the bearing 18.

The ring gear 12 is fixed within the front end opening of the case main body 1 so as not be rotated, and not to be come away (apart). For preventing the ring gear 12 from being come away, the ring gear 12 is prevented from being come away by a seal adapter 22 closing the front end opening of the case main body 1.

The seal adapter 22 is attached to the front end of the case main body 1 by a bolt 22a. The end cover 20 is attached to the seal adapter 22 by a bolt 20a.

The stepped planetary pinion 13 includes a larger diameter gear portion 13a engaged with the sun gear 11 on the input shaft 8, and a smaller diameter portion 13b engaged with the ring gear 12, and arranged to roll the stepped planetary pinion 13 along the inner circumference surface of the ring gear 12. The stepped planetary gear 13 is a stepped pinion (planetary gear) integrally constituted by the larger diameter gear portion 13a and the smaller diameter gear portion 13b.

This stepped planetary pinion 13 is disposed in a direction in which the larger diameter portion 13a is positioned on a remote side from the output shaft 9, and the smaller diameter portion 13b is positioned on a near side to the output shaft 9.

For example, four stepped planetary pinions 13 are constituted as one set. The four stepped planetary pinions 13 are arranged in a circumferential direction at an regular interval. The stepped planetary pinions 13 are rotatably supported through the pinion shafts 14 by the common carriers 15a and 15b so as to maintain this circumferential equally-spaced arrangement.

The carriers 15a and 15b function as an output rotational member of the reduction gear set 5. The carriers 15a and 15b are provided to the inner end of the output shaft 9 which is near the input shaft 8, and integrally connected with this inner end of the output shaft 9.

Accordingly, the carriers 15a and 15b and the stepped planetary pinions 13 (the pinion shafts 14) are attached to the output shaft 9 so as to be protruded from the output shaft 9 toward the input shaft 8.

Next, the connection method of the wheel 16 to the output shaft 9 is illustrated in detail.

A brake drum 25 is connected integrally coaxially with the wheel hub 21. A plurality of wheel bolts 26 are implanted (embedded) in so as to penetrate through the wheel hub 21 and the brake drum 25 to protrude in the axial direction.

At the attaching operation of the wheel 16, a wheel disc is closely attached on a bottom surface of the brake drum 25 so that the wheel bolts 26 penetrate through bolt holes formed in the wheel disc. In this state, wheel nuts 27 are securely screwed to the wheel bolts 26. With this, the wheel 16 is attached to the output shaft 9.

When the stator 6 of the electric motor 4 is energized, the rotor 7 of the electric motor 4 is drivingly rotated by the electromagnetic force therefrom. This rotational driving force is transmitted through the input shaft 8 to the sun gear 11 of the reduction gear set 5.

With this, the sun gear 11 rotates the stepped planetary pinion 13 through the larger diameter gear portion 13a. In this case, the fixed ring gear 12 functions as a reaction force receiver. With this, the stepped planetary pinion 13 performs a sun-and-planet motion (planetary motion) in which the smaller diameter portion 13b is rolled along the ring gear 12.

This sun-and-planet motion of the stepped planetary pinion 13 is transmitted through the carriers 15a and 15b to the output shaft 9, and rotates the output shaft 9 and the input shaft 8 in the same direction.

By the above-described power transmitting function, the reduction gear set 5 decreases the speed of the rotation from the electric motor 4 to the input shaft 8, by a ratio determined by a number of the teeth of the sun gear 11 and a number of the teeth of the ring gear 12, and transmits this rotation to the output shaft 9.

The rotation to the output shaft 9 is transmitted to the wheel 16 through the wheel hub 21 which is connected to the output shaft 9, and the wheel bolts 26. With this, it is possible to drivingly rotate this wheel 16.

Besides, a wheel (not shown) which is paired with the wheel 16, and which is on an opposite side in the left and right directions is also drivingly rotated by an in-wheel motor unit which is identical to that in FIG. 1, and which has an identical specification. It is possible to run the vehicle by the rotary drive by the same driving force of the pair of the left and right wheels.

At a braking of the vehicle, the wheel 16 is braked by the friction by pressing a brake shoe 27 against a drum inner circumference surface of a brake drum 25.

In the above-described in-wheel motor unit, the lubrication of the reduction gear set 5 between the input shaft 8 and the output shaft 9 is needed.

Besides, since there is no need for the lubrication of the electric motor 4, it is conceivable that a partition is provided within the case main body 1 between the electric motor 4 and the reduction gear set 5 so as to partition a receiving chamber for the electric motor 4 and a receiving chamber for the reduction gear set 5. However, in this case, the electric motor 4 and the reduction gear set 5 cannot be disposed close to each other so as to be overlapped in the radial direction as shown in FIG. 1. With this, the mountability is deteriorated due to the increase of the axial size of the in-wheel motor unit.

Accordingly, in this embodiment, the receiving chamber for the electric motor 4 and the receiving chamber for the reduction gear set 5 are used as one part as shown in FIG. 1. The electric motor 4 and the reduction gear set 5 are disposed closer to each other within the same chamber within the case main body 1 in a radially overlapped state. The axial size of the in-wheel motor unit is decreased, so that the mountability is improved.

Moreover, in this embodiment, the lubrication of the reduction gear set 5, the lubrication of the bearing 17 between the input and output shafts 8 and 9, the lubrication of the bearing 18 between the input shaft 8 and the unit case 3 are performed by a lubrication control device described below.

First, a lubrication oil passage for the lubrication control device is illustrated based on FIG. 1. A lubrication oil 31 is stored in a lower portion within the unit case 3 as shown in FIG. 1, an electric oil pump 32 is provided in that lower portion of the unit case 3.

The oil pump 32 includes a suction port 32a and a discharge port 32b. The suction port 32a is opened through an oil filter 33 to a storing portion of the oil 31 in the lower portion within the unit case 3.

Besides, a storage amount of the oil 31 is an amount by which a level 31a of the oil is not lowered than the suction port 32a by a vibration and an inclination of the vehicle. With this, the oil pump 32 can suck the oil 31 from the suction port 32a even at the vibration and the inclination of the vehicle. The storage amounts of the oil 31 of the in-wheel motor driving wheels is set so that static oil levels 31a in the lower portions within the in-wheel motor units become the same.

The rear cover 2 includes a circular oil gallery 34 formed coaxial with the input shaft 8. This oil gallery 34 is connected with the discharge port 32b of the oil pump 32. The oil gallery 34 is defined among an end surface of the input shaft 8 which is remote from the output shaft 9, an end surface of the bearing 18, and an oil cap 35 fit in the rear cover 2 so as to confront the above-described both end surfaces, so that the oil gallery 34 is formed in the rear cover 2.

An oil guide 38 is disposed among the end surface of the input shaft 8 which is remote from the output shaft 9, the end surface of the bearing 18, and the oil gap 35. As shown in FIGS. 2(*a*) and (*b*), this oil guide 38 has an overall configuration formed into a circular plate. This oil guide 38 includes a guide cylinder 38*a* which is formed at a central portion of the oil guide 38 to protrude, and guide holes 38*b* formed in a peripheral portion.

As shown in FIG. 1, the above-described oil guide 38 is installed by inserting the guide cylinder 38*a* into a corresponding end of a hollow hole 8*a* formed at a center of the input shaft 8. An opposite end of the hollow hole 8*a* is opened in a space of the mutual mounting of the input/output shafts 8 and 9.

The carrier 15*a* includes a radial oil hole 42 extending radially outwards. The input shaft 8 includes a radial oil hole 8*b* formed to be aligned with this radial oil hole 42.

A radially outer end of the radial oil hole 42 formed in the carrier 15*a* is connected with a hollow hole 43 at the center of the pinion shaft 14.

The pinion shaft 14 further includes oil injection holes 44 extending from that hollow hole 43 in the radially outward direction. The oil injection holes 44 function to supply the oil from the oil injection holes 44 to the lubrication necessary portions of the reduction gear set 5 by the centrifugal force.

The input shaft 8 further includes a radial oil hole 8*c* extending from that hollow hole 8*a* toward the bearing 17 disposed in the mutual mounting portion of the input/output shafts 8 and 9. The radial oil hole 8*c* functions to supply the oil to the bearing 17.

Functions of the above-described lubricating oil passage are illustrated below with reference to FIGS. 1 and 2.

When the lubrications of the bearings 17 and 18 and the reduction gear set 5 are needed during the operation of the in-wheel motor unit, the oil pump 32 is driven.

As shown by an arrow of FIG. 1, when the oil pump 32 is driven, the lubrication oil 31 in the lower portion within the in-wheel motor unit case 3 is sucked through the port 32*a*, and discharged from the port 32*b*. Then, this discharged oil is transmitted to the oil gallery 34.

During the rotary drive of the wheel 16 by the in-wheel motor unit, the oil within the hollow hole 43 and the oil injection holes 44 of the pinion shaft 14 is injected from the oil injection holes 44 by receiving the centrifugal force, as shown by an arrow in FIG. 1. The oil is supplied to the lubrication necessary portions of the reduction gear set 5. As shown by the arrow in FIG. 1, the amount of the oil injected from these injection holes 44 is refilled by the oil flowing to the pinion shaft hollow hole 43 from the oil gallery 34 through the guide cylinder 38*a* of the oil guide 38, the hollow hole 8*a* and the radial oil hole 8*b* of the input shaft 8, and the radial oil hole 42. With this, it is possible to perform the continuous oil supply to the reduction gear set 5.

On the other hand, the storage oil within the oil gallery 34 passes through the peripheral guide holes 38*b* formed in the oil guide 38, and flows to the bearing 18 as shown by the arrow in FIG. 1. This oil is used for the lubrication of the bearing 18.

Concurrently, the oil flowed to the hollow hole 8*a* of the input shaft 8 from the oil gallery 34 through the guide cylinder 38*a* of the oil guide 38 reaches the bearing 17 between the input/output shafts 8 and 9 through the radial oil hole 8*c*, as shown by the arrow in FIG. 1. This oil is also used for the lubrication of the bearing 17.

Incidentally, in the reduction gear set 5, the metallic powder is generated during the power transmission since the reduction gear set 5 is a machine element. This metallic powder is mixed into the oil circulating as described above.

The oil in which the metallic powder is mixed flows into the lower oil storage within the housing 3 from the pump 32 through the input shaft hollow hole 8*a*, the reduction gear set 5, and the electric motor 4. This oil stored in the lower oil storage is again sucked and circulated by the pump 32.

During this circulation, a part of the metallic powder mixed in the oil is attracted by the permanent magnets within the electric motor 4. The amount of the metallic powder attached to the electric motor 4 is increased as the time advances.

In this way, when the amount of the metallic powder attached to the electric motor 4 is increased, the performance of the electric motor 4 is deteriorated, so that the power performance of the in-wheel motor electric vehicle is deteriorated.

In the in-wheel unit of FIG. 1, below-described countermeasure is taken for dissolving this problem.

An axial groove 47 is formed on the housing inner circumference surface 3*a* in which the lower portion 6*a* of the stator 6 dipped in the oil storage is mounted. Both ends 47*a* and 47*b* of the axial groove 47 are opened, respectively, to spaces 45 and 46 on the both sides of the electric motor 4 in the axial direction so that the flow of the oil 3 between the housing space 45 on which the reduction gear set 5 is positioned, and the housing space 46 on the opposite side is performed almost through the axial groove 47.

Moreover, a permanent magnet 48 is fixed within the housing 3 closer to the opening end 47*a* of the axial groove 47 near the housing space 45 on which the reduction gear set 5 is positioned.

Besides, it is preferable that the stator 6 is molded so that at least the lower portion 6*a* is not impregnated with the oil.

In this way, the metallic powder mixed when the oil passes through the reduction gear set 5 is attracted by the permanent magnet 37 when the oil enters the opening end 47*a* of the axial groove 47 from the oil storage within the reduction mechanism receiving space 45, and removed from the oil.

With this, it is possible to prevent the metallic powder from attaching to the electric motor 4. It is possible to avoid the above-described problems that the power performance of the in-wheel motor electric vehicle is deteriorated by the deterioration of the performance of the electric motor 4 by the attachment of the metallic powder.

At the above-described lubrication of the in-wheel motor unit (the reduction gear set 5 and the bearings 17 and 18), an oil pump controller 51 of FIG. 1 controls the lubrication through the drive control of the oil pump 32, as described below.

Accordingly, the oil pump controller 51 receives a signal from an oil temperature sensor 52 arranged to sense an oil temperature Temp of the lubrication oil 31, a signal from a vehicle speed sensor 53 arranged to sense a vehicle speed VSP, a signal from a required drive torque calculating section 54 configured to calculate a required driving torque Td of the vehicle, and a signal from a running distance meter 55 arranged to measure a vehicle running distance L while the oil pump 32 is in the stop state.

Besides, the required drive torque calculating section 54 can calculate the required drive torque Td by a well-known calculation from the accelerator opening degree operated by the driver, and the rotational speed information such as the vehicle speed VSP.

Moreover, the running distance meter 55 is reset to 0 at the stop of the vehicle. The vehicle running distances in the stop state of the oil pump are accumulated (summed). With this, it is possible to measure the above-described running distance L.

Figure 3:
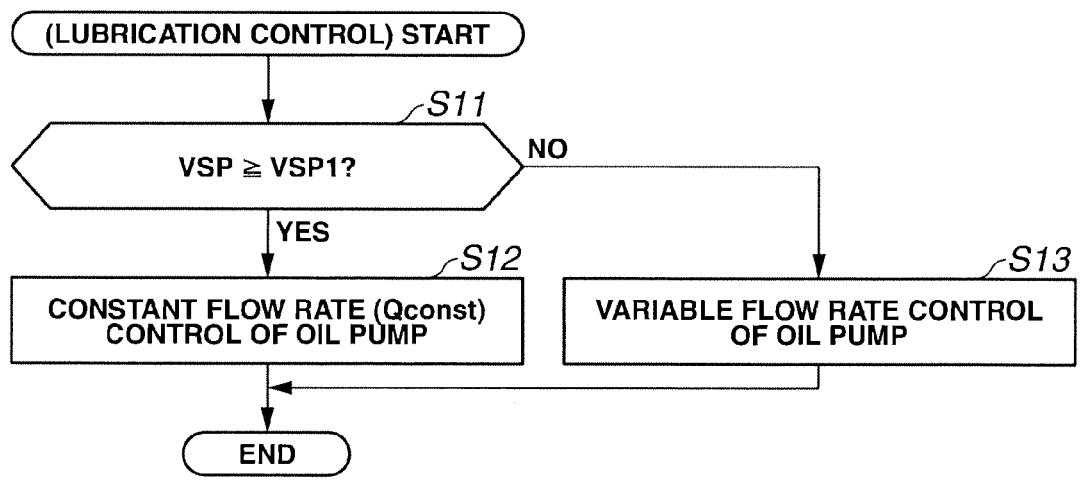
FIG. 3 is a flowchart showing a lubrication control program performed by an oil pump controller of FIG. 1.

The oil pump controller 51 performs a control program of FIG. 3 based on the above-described input information. With this, the oil pump controller 51 controls and drives the oil pump 32 so that the oil pumping amount (oil suction/transferring amount) by the oil pump 32 becomes a state exemplified in FIG. 4.

Figure 4:
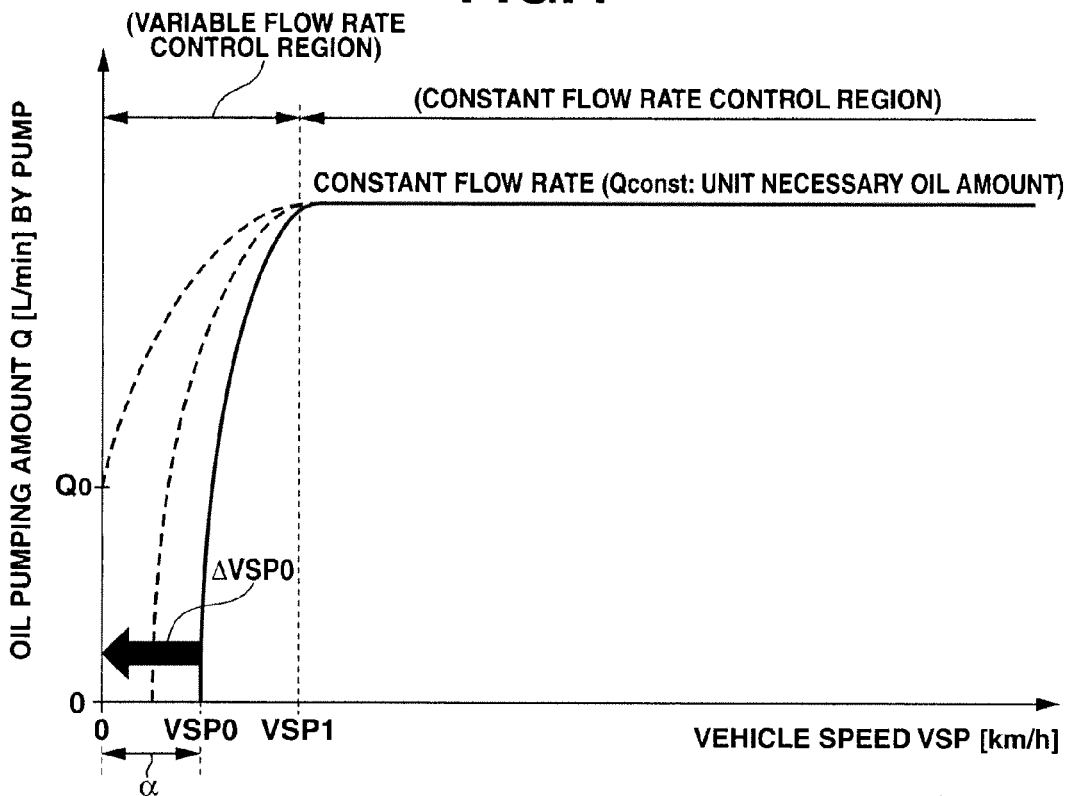
FIG. 4 is a characteristic view showing an oil pumping amount control characteristic of the oil pump which is driven and controlled by the lubrication control program of FIG. 3.

At step S11 of FIG. 3, it is checked (judged) whether or not the vehicle speed VSP is equal to or greater than a set vehicle speed VSP1 of FIG. 4.

This set vehicle speed VSP1 is a lower limit vehicle speed (for example, 30 km/h) in a high vehicle speed region in which the oil stirring resistance to the rotor 7 dipped in the oil 31 as shown by D in FIG. 1 exceeds a permission (acceptable) level (level which can be almost ignored) due to the larger diameter of the rotor 7.

In this high vehicle speed region, when the oil levels 31a of the lower portions within the in-wheel motor unit cases are different between the left and right wheels, the oil dipping amounts of the rotors 7, that is, the oil stirring resistances to the rotors 7 are largely different between the left and right wheels. With this, the large difference of the drive forces is generated between the left and right wheels. Consequently, there is caused a problem that the running stability of the vehicle is deteriorated.

Figure 5:
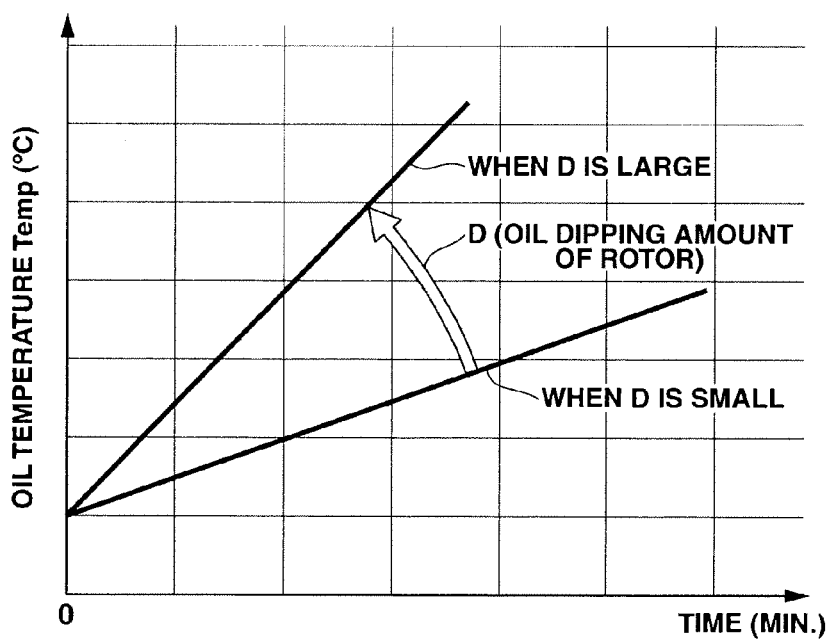
FIG. 5 is a time chart showing an oil temperature variation characteristic of the in-wheel motor unit of FIG. 1, at each oil dipping amount of an rotor.

By adding remarks by FIG. 5, this FIG. 5 is a characteristic view showing how the oil temperature Temp within the in-wheel motor unit is varied in accordance with the oil dipping amount of the rotor 7 in the no-load state at the vehicle speed VSP equal to or greater than the set vehicle speed VSP1.

A time rate of change of the oil temperature Temp is steeper as the oil dipping amount D is larger. This means that the oil stirring resistance to the rotor 7 becomes larger as the oil dipping amount D of the rotor 7 becomes larger, and the decrease of the driving force of the wheel by the power loss is intense by the power loss.

Accordingly, in the high vehicle speed region (VSP≥VSP1) in which the oil stirring resistance to rotor 7 exceeds the permission level, when the oil levels 31a of the left and right in-wheel motor units are different from each other, the difference of the oil stirring resistances to the rotors 7 becomes larger due to the difference of the oil dipping amounts D of the rotors 7 between the left and right wheels. Consequently, the large difference of the driving forces is generated between the left and right wheels. Therefore, there is caused a problem that the running stability of the vehicle is deteriorated.

Therefore, in this embodiment, when it is judged that the vehicle speed VSP is equal to or greater than the set vehicle speed VSP1 at step S11, the oil pumps 32 of the left and right in-wheel motor units are driven and controlled, respectively, so that the oil pumping amounts Q are maintained to the constant flow rate Qconst of FIG. 4 at step S12 of FIG. 3.

Accordingly, step S12 corresponds to an oil pump drive control means in the present invention.

Figure 6:
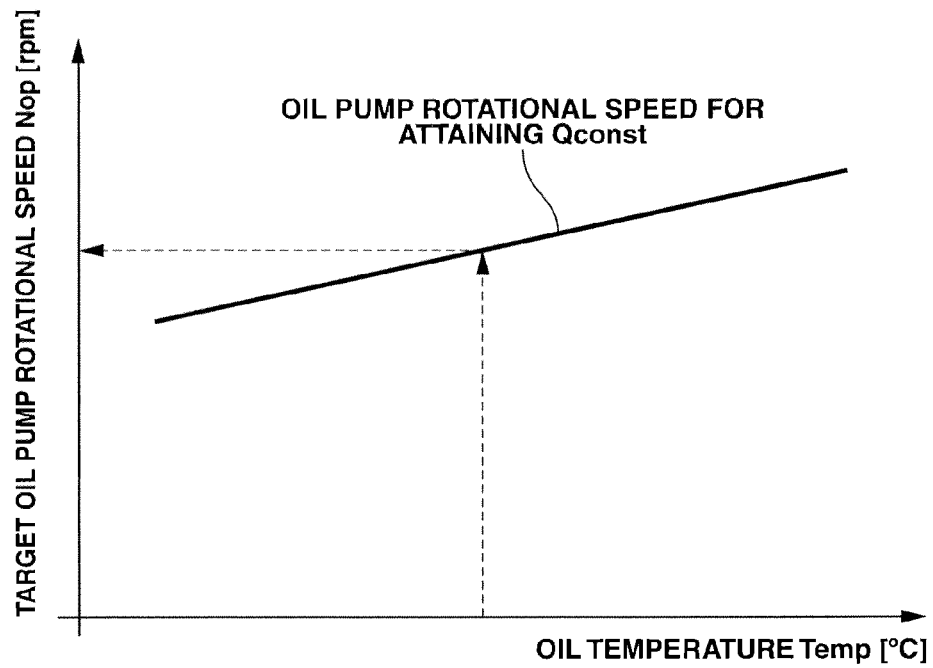
FIG. 6 is a characteristic view showing a variation characteristic of a target rotational speed of the oil pump which is necessary for attaining the constant flow rate shown in FIG. 4, in a constant flow rate control region of FIG. 4.

In this drive control, since the oil pumping amount Q of the oil pump 32 is different in accordance with the oil temperature Temp even when the oil pump 32 is at the same rotational speed, the oil pump controller 51 determines the target oil pump rotational speed Nop from the oil temperature Temp, for example, based on the constant flow rate (Qconst) attainment characteristic (the characteristic for attaining the constant flow rate (Qconst)) of FIG. 6 which considers the above-described characteristic of the oil pump 32. The oil pump controller 51 commands this to the oil pump 32 as shown in FIG. 1. The oil pump controller 51 drives and controls the oil pump 32 so that the oil pump 32 becomes this target rotational speed Nop.

By this driving control, at any oil temperature Temp, the oil pump 32 can control the oil pump pumping amount Q to the constant flow rate Qc shown in FIG. 4 in the high vehicle speed region (VSP≥VSP1).

The above-described constant flow rate Qconst is (set to) a minimum unit necessary oil amount necessary for lubricating the reduction gear set 5 within the in-wheel motor unit. For example, the above-described constant flow rate Qconst is set to, for example, an oil amount at a vehicle speed at which this unit necessary oil amount becomes largest.

When the oil pumps 32 are driven and controlled so that the oil pumping amounts Q by the oil pumps 32 of the left and right in-wheel motor units are maintained to the above-described constant flow rate Qconst, the oil levels 31a of the lower portions within the left and right in-wheel motor units are continued to the same level even during the operation of the oil pumps 32 since the static oil levels 31a of the lower portions within the left and right in-wheel motor units are the same as described above.

In this way, since the oil levels 31a of the lower portions within the left and right in-wheel motor units are maintained to the same level even during the operation of the oil pumps 32, the oil stirring resistances to the rotors 7 within the left and right in-wheel motor units are maintained to the same even in the high vehicle speed region (VSP≥VSP1) in which the oil stirring resistances to the rotors 7 exceed the permission level. The difference of the driving forces is not generated between the left and right wheels. Accordingly, it is possible to avoid the above-described problem that the running stability of the vehicle is deteriorated.

Moreover, the above-described constant flow rate Qconst in FIG. 4 is the minimum unit necessary oil amount necessary for lubricating the reduction gear set 5 within the in-wheel motor units. Accordingly, it is possible to dissolve the above described problem while the reduction gear set 5 is lubricated as required, by the minimum oil (the minimum pump consumed electric power).

When it is judged that the vehicle speed is in the low vehicle speed region (VSP<VSP1) at step S11 of FIG. 3, the control proceeds to step S13 corresponding to the oil pump drive control means in the present invention so as to perform the variable flow rate control of the oil pump 32 as follows.

This is because in the low vehicle speed region (VSP<VSP1), the rotational speed of the rotor 7 is low, the oil stirring resistance is equal to or lower than the permission level, and accordingly the above-described problem relating to the running stability is not generated, and because the lubrication required degree is low, the operation of the oil pump 32 is preferably required to be avoided in view of the saving of the electricity cost and the noise of the oil pump.

Incidentally, the oil pump 32 is not positioned inside the vehicle body in which the countermeasure of the sound insulation can be taken. The oil pump 32 is installed in the in-wheel motor unit which is exposed to the outside of the vehicle. Accordingly, it is not possible to take the countermeasure of the sound insulation. In particular, in the low vehicle speed region (VSP<VSP1) in which the in-wheel motor driving vehicle becomes the silent running state, the operating noise of the oil pump 32 becomes the unpleasant noise with respect to the occupant and also the people around the outside of the vehicle. It is preferable that the rotational speed of the oil pump 32 is lowered as much as possible, and that the oil pump 32 is brought to the non-operating state as much as possible. It is preferable to take the above-described countermeasure in consideration of the saving of the electricity cost.

Accordingly, in the variable flow rate control of the oil pump 32 in the low vehicle speed region (VSP<VSP1) which is performed at step S13, when the required drive torque Td is 0 and the running distance in the oil pump stop state is 0, the oil pump 32 is maintained in the stop state by setting the oil pumping amount Q by the oil pump 32 to 0 until the vehicle speed VSP is increased to an oil pump start vehicle speed VSP0 (vehicle speed VSP0 at which the oil pump is started), as shown by a solid line characteristic (basic characteristic) in the low vehicle speed region (VSP<VSP1) of FIG. 4. While the vehicle speed VSP is increased from the oil pump start vehicle speed VSP0 and reaches the above-described set vehicle speed VSP1, the oil pump 32 is driven and controlled so that the oil pumping amount Q is increased from 0 to the above-described constant flow rate Qconst in quadratic curve manner.

As is evident from the above-described description, this constant flow rate Qconst is the oil pumping amount (a predetermined amount in the present invention) of the oil pump 32 setting the oil levels 31a of the lower portions within the left and right in-wheel motor units to the same level. As described above, this constant flow rate Qconst corresponds to the minimum necessary oil amount necessary for lubricating the reduction gear set within the in-wheel motor unit.

At the above-described drive control of the oil pump 32 in the low vehicle speed region (VSP<VSP1), the oil pump controller 51 calculates the target oil pump rotational speed Nop for attaining the oil pumping amount Q varied from 0 to the constant flow rate Qconst as described above, in accordance with the oil temperature Temp by the method of thinking identical to the method of thinking described above with reference to FIG. 6. The oil pump controller 51 commands the target oil pump rotational speed Nop to the oil pump 32 as shown in FIG. 1.

By this drive control, at any oil temperature Temp, the oil pump 32 can control the oil pump pumping amount Q along the characteristic shown by a solid line in FIG. 4 in the low vehicle speed region (VSP<VSP1).

In this case, the oil pump start vehicle speed VSP0 is a vehicle speed at which the residual oil stored in the lubrication oil passage from the oil gallery 34 to the oil injection hole 44 is started to be injected by the centrifugal force by the start of the drive of the wheel by the in-wheel motor unit, and all of this residual oil is disappeared, or a vehicle speed at which the residual oil becomes smaller than a predetermined amount.

This is because the lubrication oil is not temporarily supplied to the reduction gear set 5 when the oil pump 32 is remained to stop after the vehicle speed reaches the thus-determined oil pump start vehicle speed VSP0, and accordingly the reduction gear set 5 is damaged by the temporal lubrication fault (defect).

Accordingly, when the required drive torque Td becomes greater than 0, the required lubrication oil amount of the reduction gear set 5 becomes larger. It is necessary that the oil pump start vehicle speed VSP0 is lowered as shown by a broken line characteristic in FIG. 4, and the oil pump 32 is early started.

For example, that is, in a "hill hold" in which the vehicle is stopped by a torque of the electric motor 4 on a climbing road, the reduction gear set 5 is in a torque transmitting state even when the vehicle speed VSP is 0. Accordingly, it is necessary to lubricate the reduction gear set 5. Even in a vehicle stop state in which the vehicle speed VSP is 0, the required lubrication oil amount is Qo exemplified in FIG. 4.

Figure 7:
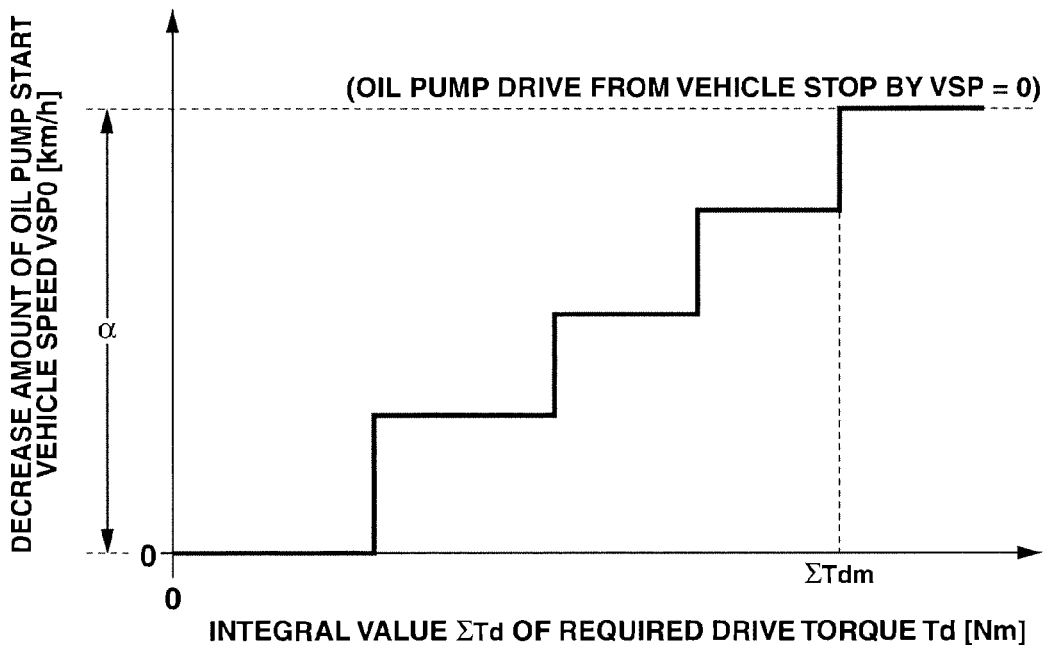
FIG. 7 is a variation characteristic view showing a variation characteristic relating to a decrease amount ΔVSP0 of an oil pump start vehicle speed VSP0 of FIG. 4, by using an integral value of an required drive torque as a parameter.

Therefore, in this embodiment, the map relating to the decrease amount $\Delta$VSP0 of the oil pump start vehicle speed VSP0 which is increased as shown, for example, in FIG. 7 in accordance with the increase of the integral value $\Sigma$Td of the required drive torque Td is previously determined and prepared by an experiment as the map relating to the decrease amount of the oil pump start vehicle speed VSP0 which is shown by $\Delta$VSP0 in FIG. 4.

Besides, in the decrease amount $\Delta$VSP0 of the oil pump start vehicle speed VSP0, a maximum value $\alpha$ is VSP0 as is evident from FIG. 4. The map of FIG. 7 means that when the integral value $\Sigma$Td of the required drive torque Td is equal to or greater than a value $\Sigma$Tdm, the oil pump start vehicle speed VSP0 is 0 by $\Delta$VSP0=$\alpha$, and that, for example, the request in the above-described hill hold can be satisfied by driving the oil pump 32 from the vehicle stop state.

When the step S13 of FIG. 3 is performed in the low vehicle speed region (VSP<VSP1), the oil pump controller 51 drives and controls the oil pump 32 by the above described control so that the oil pumping amount Q is varied by the solid line characteristic of FIG. 4 when the integral value $\Sigma$Td of the required drive torque Td is 0. However, when the integral value $\Sigma$Td of the required drive torque Td exceeds 0, the oil pump controller 51 determines the decrease amount $\Delta$VSP0 of the oil pump start vehicle speed VSP0 from the map of FIG. 7 in accordance with the integral value $\Sigma$Td of the required drive torque Td, and drives and controls the oil pump 32 by using (VSP0–$\Delta$VSP0) as the oil pump start vehicle speed, so as to attain the variation characteristic of the oil pumping amount Q as exemplified by a broken line in FIG. 4.

On the other hand, when the running distance L in the oil pump stop state becomes greater than 0 due to the start of the vehicle, the residual oil amount is decreased by the injection by the centrifugal force. Accordingly, it is necessary that the oil pump 32 is early started by decreasing the oil pump start vehicle speed VSP0 as shown by the broken line characteristic.

Figure 8:
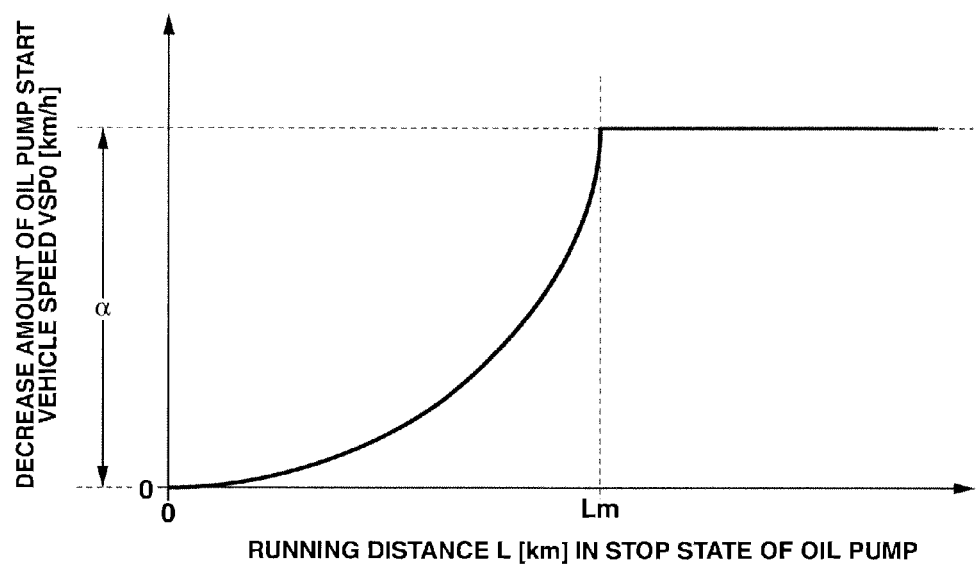
FIG. 8 is a variation characteristic view showing a variation characteristic relating to the decrease amount ΔVSP0 of the oil pump start vehicle speed VSP0 of FIG. 4, by using a running distance in the stop state of the oil pump as a parameter.

Accordingly, in this embodiment, the map relating to the decrease amount $\Delta$VSP0 of the oil pump start vehicle speed VSP0 which is increased as shown, for example, in FIG. 8 in accordance with the increase of the running distance L in the oil pump stop state is previously determined and prepared by an experiment.

Besides, the map of FIG. 8 is set so that the oil pump start vehicle speed VSP0 is 0 by $\Delta$VSP0=$\alpha$ when the running distance L in the oil pump stop state is equal to or greater than a value Lm, and so that the situation of the lubrication fault due to the generation of a non-operation period of the oil pump 32 despite that the above-described residual oil is disappeared or that the above-described residual oil is smaller than the predetermined amount due to L≥Lm is not generated by driving the oil pump 32 from the vehicle stop state.

When the step S13 of FIG. 3 is performed in the low vehicle speed region (VSP<VSP1), the oil pump controller 51 drives and controls the oil pump 32 by the above-described control so that the oil pumping amount Q is varied by the solid line characteristic of FIG. 4 when the running distance L in the oil pump stop state is 0. However, when the running distance L in the oil pump stop state exceeds 0, the oil pump controller 51 determines the decrease amount ΔVSP0 of the oil pump start vehicle speed VSP0 from the map of FIG. 8 in accordance with the running distance L in the oil pump stop state, and drives and controls the oil pump 32 by using (VSP0−ΔVSP0) as the pump start vehicle speed so as to attain the variation characteristic of the oil pumping amount Q as exemplified by the broken line in FIG. 4.

In the lubrication control of the in-wheel motor unit according to the above-described structure of the present embodiment, in the high vehicle speed region (VSP≥VSP1) in which the oil stirring resistances to the rotors 7 exceed the permission level, the oil pumps 32 of the left and right in-wheel motor units are driven and controlled, respectively, so that both of the oil pumping amounts Q are maintained to the constant flow rate Qconst of FIG. 4. Accordingly, since the static oil levels 31a of the lower portions within the left and right in-wheel motor unit are the same, the oil levels 31a of the lower portions within the left and right in-wheel motor units are continued to be maintained to the same even during the operation of the oil pump 32.

Accordingly, even in the high vehicle speed region (VSP≥VSP1) in which the oil stirring resistances to the rotors 7 exceed the permission level, the oil stirring resistances to the rotors 7 within the left and right in-wheel motor units are maintained to the same. The driving force difference is not generated between the left and right wheels. Consequently, it is possible to avoid the problem that the running stability of the vehicle is deteriorated.

This effect is attained by the simple constant flow rate control of the oil pump 32. Accordingly, it is highly advantageous for the cost.

Moreover, the above-described constant flow rate Qconst in FIG. 4 is the minimum unit necessary oil amount necessary for lubricating the reduction gear set 5 within the in-wheel motor unit. Accordingly, it is possible to dissolve the above-described problem while the reduction gear set 5 is lubricated as required by the minimum oil (the minimum pump consumed electric power).

Moreover, at the above-described drive control of the oil pump 32, the target oil pump rotational speed Nop is determined from the oil temperature Temp based on the constant flow rate (Qconst) attainment characteristic of the oil pump 32 which is exemplified in FIG. 6, and the oil pump 32 is driven and controlled so as to attain this target rotational speed Nop. Accordingly, at any oil temperature Temp, the oil pump 32 can control the oil pump pumping amount Q to the constant flow rate Qconst shown in FIG. 4 in the high vehicle speed region (VSP≥VSP1). It is possible to surely achieve the above-described effects.

Moreover, in this embodiment, the above-described constant flow rate control of the oil pump 32 is performed only in the high vehicle speed region (VSP≥VSP1) in which the oil stirring resistances to the rotors 7 exceed the permission level, and in which the "problem of the running stability" that is the problems solved by the present invention is generated. In the low vehicle speed region (VSP<VSP1) in which the oil stirring resistances to the rotors 7 are smaller than the permission level, in which the "problem of the running stability" is not generated, and in which the lubrication required degree of the reduction gear set 5 is low, the oil pump 32 is controlled by the variable flow rate control so that the oil pumping amounts Q are smaller than the constant flow rate Qconst as shown in FIG. 4, and so that the oil pumping amounts Q become smaller as the vehicle speed VSP becomes lower. Accordingly, it is possible to attain effects described below.

That is, in this low vehicle speed region (VSP<VSP1), in particular, in an extreme vehicle speed region of VSP<VSP0 including the vehicle stop, the in-wheel motor drive vehicle is in the silent running state. Accordingly, the operation noise of the oil pump 32 is the unpleasant noise to the occupant, and also the people around the outside of the vehicle. Consequently, it is preferable that the rotational speed of the oil pump 32 is lowered as much as possible, and that the oil pump 32 is in the non-operation state if possible. It is preferable to take the above-described countermeasure in view of the saving of the electricity cost.

In this embodiment, in the above-described low vehicle speed region (VSP<VSP1), the variable flow rate control of the oil pump 32 is performed so that the oil pumping amounts Q become lower than the constant flow rate Qconst as shown in FIG. 4, and so that the oil pumping amounts Q become smaller as the vehicle speed VSP becomes lower. Accordingly, it is possible to attain the above-described request.

In particular, in the extreme vehicle speed region of VSP<VSP0 including the vehicle stop, the oil pump 32 is stopped while the operation is not needed in view of the lubrication. Accordingly, it is possible to prevent the operation noise of the oil pump 32 from becoming the "noise", and to prevent the consumed electric power of the oil pump 32 from increasing due to the unnecessary operation.

In the low vehicle speed region (VSP<VSP1) which is smaller than the set vehicle speed VSP1 at which the stirring resistances by the oil 31 of the lower portions within the in-wheel motor unit cases do not exceed the permission level, the oil pumps 32 are driven and controlled so that the oil pumping amounts Q are gradually increased as shown in FIG. 4 as the vehicle speed is increased, so that the above-described effects are obtained. In this case, at the increase of the vehicle speed by which the vehicle speed VSP reaches the set vehicle speed VSP1, the oil pumps 32 are driven and controlled so that the oil pumping amounts Q become the predetermined amount Qconst by which the oil levels 31a in the lower portions within the left and right in-wheel motor unit cases are the same. Accordingly, in a transition from the low vehicle speed region (VSP<VSP1) to the high vehicle speed region (VSP≥VSP1), the oil levels 31a in the lower portions within the cases of the left and right in-wheel motor units can be the same. Consequently, it is possible to avoid the problem that the large driving force difference between the left and right wheels is generated in the transition to the high vehicle speed region (VSP≥VSP1), and that the running stability is deteriorated.

That is, in the low vehicle speed region which is smaller than the set vehicle speed at which the stirring resistances by the oil of the lower portions within the in-wheel motor unit cases do not exceed the permission level, the oil pumps 32 are driven and controlled so that the oil pumping amounts are gradually increased as the vehicle speed is increased. Accordingly, it is possible to suppress the useless drive of the oil pump 32 in the low vehicle speed region, and to perform, for example, the countermeasure of the noise, and the saving the electric cost.

That is, in the transition from the low vehicle speed region to the high vehicle speed region by the increase of the vehicle speed to the set vehicle speed, the oil pumps 32 are driven and controlled so that the oil pumping amounts become the predetermined amount by which the oil levels 31a in the lower portions within the cases of the left and right in-wheel motor units are the same. Accordingly, in the transition from the low vehicle speed region to the high vehicle speed region, it is possible to ensure that oil levels $31a$ in the lower portions within the cases of the left and right in-wheel motor units become the same.

Accordingly, in the transition from the low vehicle speed region to the high vehicle speed region, the oil dipping amounts of the larger diameter rotational members (the rotors 7 of the electric motors 4) within the in-wheel motor units can be the same between the left and right in-wheel motor units. Therefore, the oil stirring resistances by the larger diameter rotational members are the same between the left and right in-wheel motor units.

Accordingly, even in the transition to the high vehicle speed region in which the oil stirring resistances by the larger diameter rotational members (the rotors 7 of the electric motors 4) cannot be permitted, the driving force difference is not generated between the left and right in-wheel motor units. Moreover, the running stability of the in-wheel motor driving vehicle is not deteriorated.

The invention claimed is:

1. A lubrication control device of in-wheel motor units for an in-wheel motor drive vehicle that can run by driving at least a pair of left and right wheels by respective in-wheel motor units of a pair of left and right in-wheel motor units, wherein:
the lubrication control device is arranged to control lubrication within the pair of left and right in-wheel motor units, by oil pumped from lower portions within cases of the in-wheel motor units by respective oil pumps, and
the lubrication control device comprises a controller including an oil pump drive control section configured to control and drive the oil pumps so that oil levels of the lower portions within the cases of the left and right in-wheel motor units are the same, by controlling oil pumping amounts from the oil pumps,
wherein the oil pump drive control section is configured to control and drive the oil pumps in a high vehicle speed region such that the oil pumping amounts from the oil pumps are maintained to a constant amount, by which the oil levels of the lower portions within the cases of the left and right in-wheel motor units are the same,
wherein oil of the same oil level is stored, respectively, in the lower portions within the cases of the left and right in-wheel motor units,
wherein the oil pump drive control section is configured to control and drive the oil pumps in the high vehicle speed region based on a temperature of the oil, so that the oil pumping amounts are maintained to the constant amount, and
wherein, in a low vehicle speed region which is lower than the high vehicle speed region, the oil pump drive control section is configured to control starting of the oil pumps based on at least a running distance, the running distance being a distance which the vehicle has traveled while the oil pumps are in a stop state.

2. The lubrication control device of the in-wheel motor units for the vehicle as claimed in claim 1, wherein the constant amount is a minimum amount of oil necessary to lubricate the in-wheel motor units.

3. The lubrication control device of the in-wheel motor units for the vehicle as claimed in claim 1, wherein:
the oil pumps are a pair of left and right oil pumps, and the oil pump drive control section is configured to drive and control the oil pumps so that the oil pumping amounts by the pair of the left and right oil pumps become the same.

4. The lubrication control device of the in-wheel motor units for the vehicle as claimed in claim 1, wherein, in the high vehicle speed region, stirring resistances by the oil of the lower portions within the cases of the in-wheel motor units exceed a permission level.

5. The lubrication control device of the in-wheel motor units for the vehicle as claimed in claim 4, wherein the oil pump drive control section is configured to drive and control the oil pumps so that the oil pumping amounts are constant in the high vehicle speed region, and, in the low vehicle speed region that is lower than the high vehicle speed region, the oil pumping amounts become smaller than the constant amount.

6. The lubrication control device of the in-wheel motor units for the vehicle as claimed in claim 5, wherein the oil pump drive control section is configured to control and drive the oil pumps so that the oil pumping amounts become smaller in the low vehicle speed region as the vehicle speed becomes lower.

7. The lubrication control device of the in-wheel motor units for the vehicle as claimed in claim 1, wherein the oil pump drive control section drives and controls the oil pumps so that the oil pumping amounts from the oil pumps are gradually increased as the vehicle speed is increased in the low vehicle speed region which is smaller than a set vehicle speed at which stirring resistances by the oil of the lower portions within the cases of the in-wheel motor units do not exceed a permission level, and drives and controls the oil pumps as the vehicle speed increases to the set vehicle speed so that the oil pumping amounts become a predetermined amount by which the oil levels of the lower portions within the cases of the left and right in-wheel motor units are the same.

8. The lubrication control device of the in-wheel motor units for the vehicle as claimed in claim 7, wherein the oil pump drive control section is configured to drive and control the oil pumps in the high vehicle speed region, which is equal to or greater than the set vehicle speed, such that the oil pumping amounts from the oil pumps are maintained to the predetermined amount.

9. The lubrication control device of the in-wheel motor units for the vehicle as claimed in claim 7, wherein the predetermined amount is a minimum oil amount to lubricate the in-wheel motor units.

10. A lubrication control device of in-wheel motor units for an in-wheel motor drive vehicle that can run by driving at least a pair of left and right wheels by respective in-wheel motor units of a pair of left and right in-wheel motor units, wherein:
the lubrication control device is arranged to control lubrication within the pair of left and right in-wheel motor units, by oil pumped from lower portions within cases of the in-wheel motor units by respective oil pumps, and
the lubrication control device comprises a controller including an oil pump drive control section configured to control and drive the oil pumps so that oil levels of the lower portions within the cases of the left and right in-wheel motor units are the same, by controlling oil pumping amounts from the oil pumps,
wherein the oil pump drive control section is configured to control and drive the oil pumps in a high vehicle speed region such that the oil pumping amounts from the oil pumps are maintained to a constant amount, by which the oil levels of the lower portions within the cases of the left and right in-wheel motor units are the same, wherein oil of the same oil level is stored, respectively, in the lower portions within the cases of the left and right in-wheel motor units, wherein the oil pump drive control section is configured to control and drive the oil pumps in the high vehicle speed region based on a temperature of the oil, so that the oil pumping amounts are maintained to the constant amount, wherein the oil pump drive control section is configured to control and drive the oil pumps during an entirety of the high vehicle speed region, and wherein the high vehicle speed region is a region in which the speed of the vehicle is a predetermined speed or more, and the oil pumps are driven during the entirety of the high vehicle speed region at all temperatures of the oil in the high vehicle speed region.

* * * * *